US005613581A

United States Patent [19]
Fonkalsrud et al.

[11] Patent Number: 5,613,581
[45] Date of Patent: Mar. 25, 1997

[54] ELECTROHYDRAULIC CONTROL DEVICE FOR A DRIVE TRAIN OF A MACHINE

[75] Inventors: Andrew O. Fonkalsrud, Yorkville; Steven V. Christensen, Peoria; Mitchell J. McGowan, Groveland; Thomas L. Grill, Marseilles, all of Ill.

[73] Assignee: Caterpillar Inc., Peoria, Ill.

[21] Appl. No.: 584,506

[22] Filed: Jan. 11, 1996

[51] Int. Cl.$^6$ .................................................. B60K 41/28
[52] U.S. Cl. .......................... 192/3.23; 192/3.26; 192/3.3; 192/3.33; 192/4 R; 192/82 T; 74/731.1
[58] Field of Search .................. 192/3.21, 3.23, 192/3.25, 3.26, 3.3, 3.33, 3.58, 4 R, 4 C, 13 R, 82 T; 74/731.1, 732.2, 335

[56] References Cited

U.S. PATENT DOCUMENTS

| | | | |
|---|---|---|---|
| 5,040,648 | 8/1991 | Mitchell et al. | 192/3.58 |
| 5,456,333 | 10/1995 | Brandt et al. | 192/3.58 X |
| 5,509,520 | 4/1996 | Evans et al. | 192/3.23 |

*Primary Examiner*—Richard M. Lorence
*Attorney, Agent, or Firm*—David M. Masterson

[57] ABSTRACT

An electrohydraulic control device for a drive train of a machine including an engine, a transmission, a torque converter, and an impeller clutch is disclosed. A manually operated impeller clutch pedal produces an impeller clutch pedal signal in response to the position of the impeller clutch pedal. An impeller clutch electrohydraulic valve produces fluid flow to the impeller clutch to controllably engage and disengage the impeller clutch. An impeller clutch pressure curve that is responsive to the impeller clutch pedal position is stored in memory. A rotary position switch selects a desired rimpull setting indicative of a desired reduction in rimpull and produces a desired rimpull signal. An electronic controller receives the desired rimpull signal and reconfigures the impeller clutch pressure curve. Thereafter, the electronic controller receives the impeller clutch pedal signal and controllably actuates the electrohydraulic valve to produce a desired impeller clutch pressure defined by the impeller clutch pressure curve.

14 Claims, 3 Drawing Sheets

ELECTROHYDRAULIC CONTROL DEVICE FOR A DRIVE TRAIN OF A MACHINE

TECHNICAL FIELD

The present invention relates generally to an electrohydraulic control device for controllably operating a machine to reduce driveline torque, and more particularly to an electrohydraulic control device for selectively controlling the pressure of a torque converter impeller clutch to reduce driveline torque.

BACKGROUND ART

It is desirable to provide a driveline torque control of a machine while the engine is operating at high idle. In a wheel loader type machine, such a control allows the operator to "inch" the machine into a pile of material while providing full power to the implement hydraulics to capture the material. The driveline torque control additionally reduces rimpull, which is useful for reducing wheel slipping.

In one conventional mode of "inching" a machine, the transmission is kept in gear and the brakes are manually modulated by use of a foot pedal. This is undesirable because it requires considerable operator effort and because the service brakes experience a relatively rapid rate of wear.

In another conventional method of providing inching capabilities to a machine, an impeller clutch is connected between a machine's engine and transmission. Typically, the impeller clutch is actuated through an operator pedal. The operator pedal acts to engage and disengage the impeller clutch, thereby, varying the power transmitted by the drive train to slow the machine and reduce wheel slip. However, maintaining the machine at a speed proportional to the operator pedal is difficult due to changes in torque on the drive train.

The present invention is directed to overcoming one or more of the problems as set forth above.

DISCLOSURE OF THE INVENTION

In one aspect of the present invention, an electrohydraulic control device for a drive train of a machine is disclosed. A manually operated impeller clutch pedal produces an impeller clutch pedal signal in response to the position of the impeller clutch pedal. An impeller clutch electrohydraulic valve produces fluid flow to the impeller clutch to controllably engage and disengage the impeller clutch. An impeller clutch pressure curve that is responsive to the impeller clutch pedal position is stored in memory. A rotary position switch selects a desired rimpull setting indicative of a desired reduction in rimpull and produces a desired rimpull signal. An electronic controller receives the desired rimpull signal and reconfigures the impeller clutch pressure curve. Thereafter, the electronic controller receives the impeller clutch pedal signal and controllably actuates the electrohydraulic valve to produce a desired impeller clutch pressure defined by the impeller clutch pressure curve.

BRIEF DESCRIPTION OF THE DRAWINGS

For a better understanding of the present invention, reference may be made to the accompanying drawings in which:

FIG. 4 shows a graph illustrating a modified impeller clutch pressure curve.

BEST MODE FOR CARRYING OUT THE INVENTION

Figure 1:
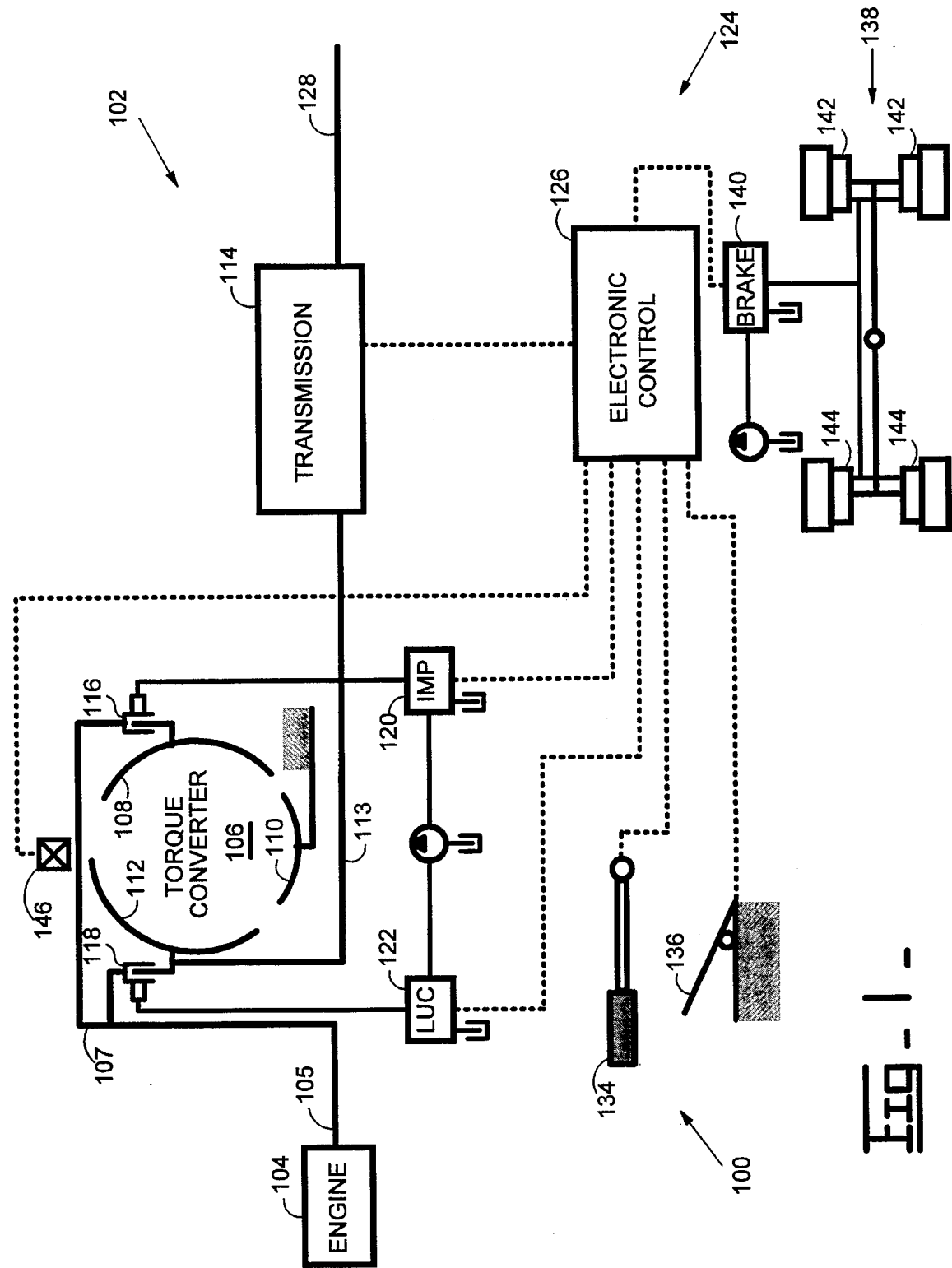
FIG. 1 shows a block diagram of a power train control system for a machine.

The present invention is directed toward controlling the driveline torque of an earth working machine 100, such as a wheel loader. A power or drive train 102 for the machine is illustrated in FIG. 1. The drive train includes an engine 104 having a shaft 105 connected to a hydrodynamic torque converter 106. The torque converter includes, rotating housing 107, an impeller element 108, a reactor element 110, and a turbine element 112 connected to a centrally located output shaft 113. The output shaft provides the input to a multispeed transmission 114 that preferably has a plurality of interconnected planetary gear sets selectively engaged in cooperating groupings by operation of a pair of disc-type directional clutches or brakes and a plurality of disc-type speed clutches or brakes. The output of the transmission rotates a driveline 128 that is connected to the drive wheels of the machine.

The drive train preferably includes a disc-type input clutch or impeller clutch 116 located between the engine 104 and the torque converter 106 for controllably coupling the rotating housing to the impeller element, and a disc-type lockup clutch 118 for selectively coupling the rotating housing to the turbine element and the output shaft for a direct mechanical connection that effectively bypasses the torque converter. An electrohydraulic clutch valve 120 provides fluid flow to actuate the impeller clutch, while an electrohydraulic lockup clutch valve 122 provides fluid flow to actuate the lockup clutch.

An electrohydraulic control device 124 is provided to control the operation of the drive train. The control device includes an electronic control module 126 containing an internal microprocessor. The term microprocessor is meant to include microcomputers, microprocessors, integrated circuits and the like capable of being programmed. The electronic control module contains sufficient electronic circuitry to convert input signals from a plurality of sensors and switches to a form readable by the microprocessor, and circuitry to generate sufficient power to drive a plurality of solenoids for actuating the transmission 114, the impeller clutch 116, and the lockup clutch 118 according to signals produced by the control module. The microprocessor is programmed with preselected logic rules for receiving one or more manually selected operating signals and a plurality of automatically generated operating signals.

A temperature sensor 146 is provided to sense the torque convertor temperature. Accordingly, the temperature sensor delivers a temperature signal indicative of the torque converter temperature to the electronic control module.

The electrohydraulic control device 124 includes an operator control handle 134 for selectively controlling the operation of the transmission. The control handle generates transmission control signals to the control module indicative of a desired gear ratio and/or direction of the machine. An operator impeller clutch pedal 136 is provided for selectively controlling the degree of engagement of the impeller clutch. The impeller clutch pedal is rockable about a transversely oriented pivot pin. As the pedal is depressed from an elevated position to an intermediate position the ability of the impeller clutch 116 to transmit torque to the impeller element 108 from the engine is proportionately reduced. When depressed, the impeller clutch pedal generates an impeller clutch pedal signal to the electronic control module proportional to the pedal position.

Braking of the machine occurs in response to actuation of a brake pedal (not shown) that operates a service brake mechanism 138 that includes a hydraulic valve 140 and a front/rear set of brakes 142, 144. Further, braking of the machine may be also be initiated via the impeller clutch pedal being depressed beyond a predetermined position. Note, the brake valve 140 may be actuated mechanically or electronically. Thus, the brake pedal and the impeller clutch pedal may manually or electronically operate the brake valve. In the remaining description the present invention will be described in relation to an electronically actuated brake valve, although it will be apparent to those skilled in the art that a mechanically actuated brake valve may equally be used. Finally, an accelerator pedal (not shown) may be provided to control the speed of the engine.

It is well known to modulate the impeller clutch in response to the depression of the impeller clutch pedal to provide for an open loop driveline torque control. Further it is also well known to modulate the service brakes in response to the impeller clutch pedal position. For example, reference is now made to the graph shown in FIG. 2 which illustrates the impeller clutch pressure as a percentage of maximum, and the brake pressure as a percentage of maximum; both as a function of the impeller clutch pedal depression. For example, as the pedal is depressed from a fully elevated 45° first position to an intermediate 33° second position, the electronic control module adjusts the impeller clutch pressure proportionally. Further depression of the pedal causes it to be positioned beyond a 33° second position, progressively directing the actuation of the service brakes, to a fully depressed third position of 25°. Thus, this prior control has a predetermined amount of overlap between the impeller clutch and brake actuation to control the driveline torque. One such system is disclosed in U.S. Pat. No. 5,040,648 issued to Mitchell et al. on Aug. 20, 1991, which is hereby incorporated by reference.

The present invention provides the operator with the ability to reconfigure the impeller clutch pressure curve to reduce the maximum allowable impeller clutch pressure; thereby, providing the operator with improved controllability of the driveline torque or rimpull. Rimpull is the tractive force that a machine is able to generate. Note that, the maximum allowable impeller clutch pressure is typically only reduced in response to the machine traveling in first gear.

Figure 3:
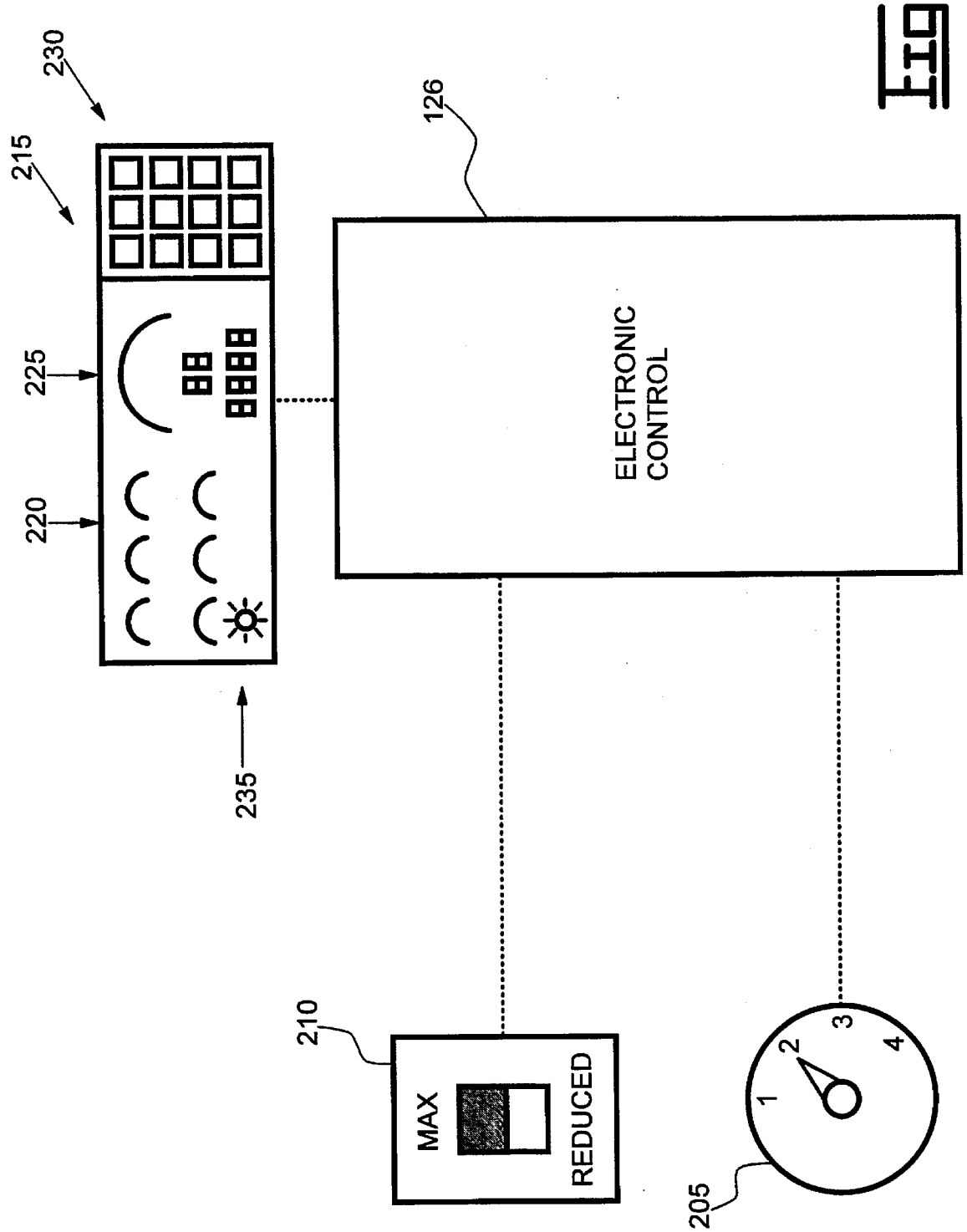
FIG. 3 shows a block diagram of the machine's control panel.

Reference is now made to FIG. 3, which shows a block diagram of an operator control panel. A four position rotary switch 205 is provided to select one of four reduced rimpull settings. Each rimpull setting corresponds to a reduced driveline torque or rimpull. For example, setting 1 may correspond to 80% of maximum rimpull, setting 2 may correspond to 75% of maximum rimpull, setting 3 may correspond to 70% of maximum rimpull, and setting 4 may correspond to 65% of maximum rimpull. A two position rocker switch 210 is provided to select either 100% maximum rimpull or the reduced rimpull setting indicated by switch 205. The electronic control receives signals indicative of the switch positions and based upon the switch positions, reconfigures the impeller clutch pressure curve. It will be apparent to those skilled in the art that the four position rotary switch may be selectable between a plurality of discrete settings or infinitely selectable between two discrete settings.

Figure 2:
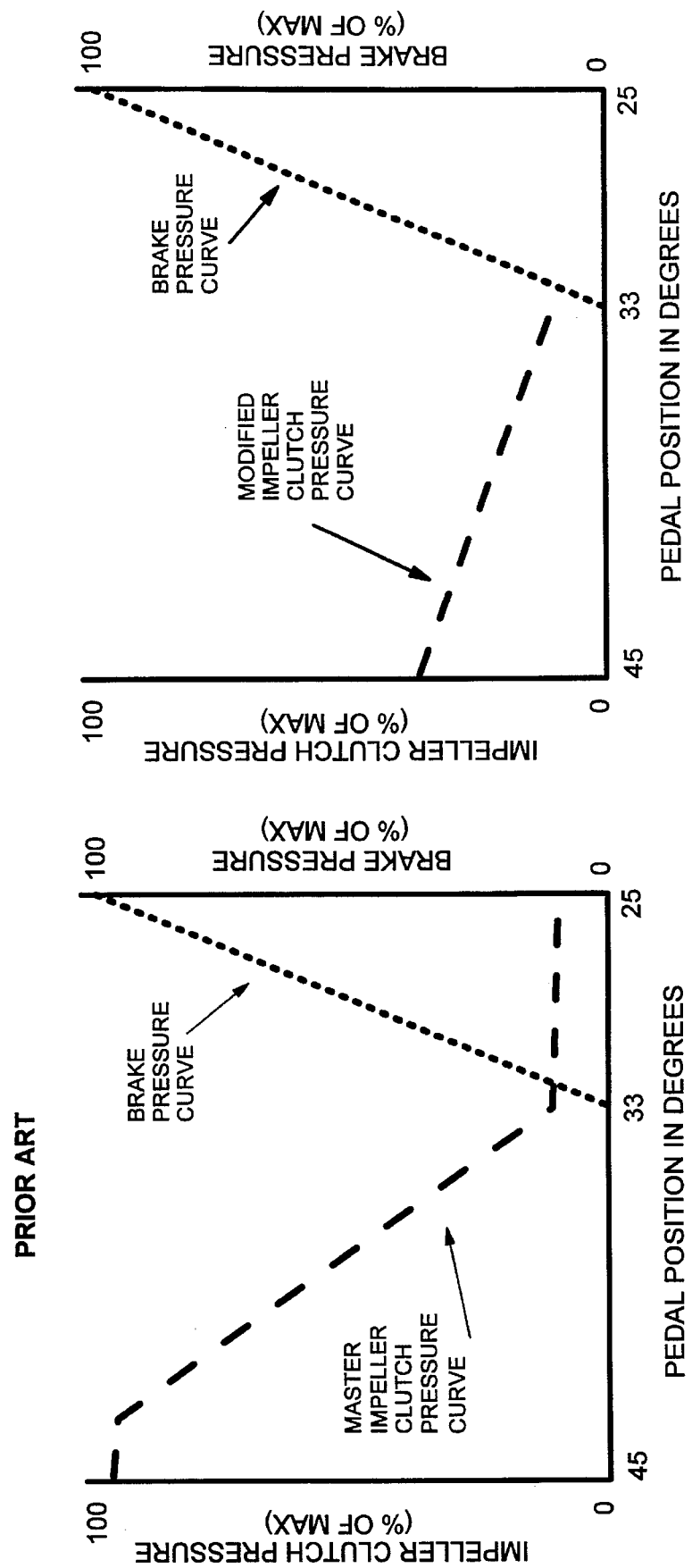
FIG. 2 shows a graph illustrating impeller clutch pressure and brake pressure curves.

The impeller clutch pressure curve is reconfigured from the master impeller clutch pressure curve shown in FIG. 2, to the modified impeller clutch pressure curve shown in FIG. 4. Depending upon the setting of position switch 205, the electronic control changes the maximum allowable pressure associated with the master impeller clutch pressure curve to a reduced maximum allowable pressure that corresponds to the desired reduction in driveline torque or rimpull. Although the present invention is discussed in relation to reconfiguring the master impeller clutch pressure curve, it will be apparent to those skilled in the art the multiple impeller clutch pressure curves may be used. For example, each rimpull setting may correspond to one of a plurality of impeller clutch pressure curves where each corresponds to a maximum allowable impeller clutch pressure.

Assume that the operator selects a rimpull setting of 3 corresponding to a desired rimpull of 70% of maximum rimpull. The electronic control receives a desired rimpull signal indicating the rimpull setting of 3, and determines the corresponding reduced maximum allowable impeller clutch pressure. The electronic controller first determines the pedal position that would result in 70% of maximum rimpull. In this example, 70% of maximum rimpull corresponds to a 30% Best Mode for Carrying Out the Invention depression of the pedal or a pedal position of 40°. Then, from the master impeller clutch pressure curve, the corresponding impeller clutch pressure may be determined, e.g., a pedal position of 40° corresponds to an impeller clutch pressure of 45% of maximum clutch pressure. The impeller clutch pressure of 45% of maximum clutch pressure becomes the reduced maximum allowable impeller clutch pressure. The electronic controller then reconfigures the impeller clutch curve with a maximum allowable impeller clutch pressure being equal to 45% of maximum clutch pressure.

The reconfigured or modified impeller clutch pressure curve is shown in FIG. 4. Now, the impeller clutch pressure corresponding to the fully elevated first position will equal the reduced maximum allowable clutch pressure, e.g., 45% of maximum allowable impeller clutch pressure. Advantageously, pedal travel deadband is nonexistent and all the usable pedal travel is available to the operator in the rimpull or pressure range that the operator selects.

Note, it may be desirable to revert back to 100% of maximum rimpull in response to the torque converter temperature exceeding a maximum allowable temperature. Thus, in response to the magnitude of the temperature signal being greater than a predetermined value, the electronic control changes the maximum allowable impeller clutch pressure to that associated with the master impeller clutch pressure curve. Consequently, the torque converter and transmission are protected from overheating due to a slipping impeller clutch.

The impeller clutch and brake pressure curves are stored in a three dimensional look-up table in software that is resident in the electronic controller. For example, the look-up table stores a plurality of impeller clutch and brake pressure values that correspond to a plurality of pedal positions. Similarly, the reduced rimpull settings and associated reduced maximum allowable impeller clutch pressures are stored in software that is resident in the electronic controller. Note, if a mechanically operated brake valve is used, no such brake pressure curves need be stored.

To provide flexibility to the operator, the present invention allows the reduced rimpull settings to be modifiable. For example, referring back to FIG. 3, an instrument panel 215 is shown. The instrument panel includes a set of analog gauges 220, a set of digital gauges 225, a keypad 230, and a rimpull indicator lamp 235. The lamp is used to indicate to the operator that the reduced rimpull is "active." By selecting the proper mode via the keypad 230, the digital gauges will display the switch position of switch 205 and the corresponding reduced rimpull setting. By entering another mode via the keypad 230 or by using an external device, such as a service tool, the operator is able to change the reduced rimpull setting of each switch via the impeller clutch pedal. This allows the operator to customize the reduced rimpull settings depending upon the machine operating conditions.

Thus, while the present invention has been particularly shown and described with reference to the preferred embodiment above, it will be understood by those skilled in the art that various additional embodiments may be contemplated without departing from the spirit and scope of the present invention.

Industrial Applicability

With respect to the drawings and in operation, the present invention provides for a driveline torque control of a machine while the engine is operating a high idle. This allows the operator to "inch" the machine and reduce driveline torque while providing full power to the implement hydraulics. Thus, rimpull is reduced, which reduces wheel slipping. To this end, the electrohydraulic control device controls the impeller clutch pressure to pressure levels defined by the impeller clutch pressure curve in response to the impeller clutch pedal position to reduce the driveline torque. To provide the operator with greater control over the driveline torque, the present invention reconfigures the impeller clutch pressure curve to provide for improved pedal modulation between desired impeller clutch pressure levels. Moreover, the present invention provides for greater operator repeatability to return to a desired rimpull due to the discrete rimpull setting that is available to the operator via the rimpull switch.

Other aspects, objects and advantages of the present invention can be obtained from a study of the drawings, the disclosure and the appended claims.

We claim:

1. An electrohydraulic control device for a drive train of a machine including an engine, a transmission, a torque converter, and an impeller clutch connected between the engine and the torque converter, comprising:

a manually operated impeller clutch pedal produces an impeller clutch pedal signal in response to the position of the impeller clutch pedal;

an impeller clutch electrohydraulic valve for producing fluid flow to the impeller clutch to controllably engage and disengage the impeller clutch;

memory means for storing an impeller clutch pressure curve that is responsive to the impeller clutch pedal position;

operator selectable means for selecting a desired rimpull setting indicative of a desired reduction in rimpull and producing a desired rimpull signal;

means for receiving the desired rimpull signal and reconfiguring the impeller clutch pressure curve; and means for receiving the impeller clutch pedal signal and controllably actuating the electrohydraulic valve to produce a desired impeller clutch pressure defined by the impeller clutch pressure curve.

2. An electrohydraulic control device, as set forth in claim 1, wherein the operator selectable means includes a rotary position switch.

3. An electrohydraulic control device, as set forth in claim 2, wherein the desired rimpull settings are modifiable by the operator.

4. An electrohydraulic control device, as set forth in claim 3, including a temperature sensor for sensing the temperature of the torque converter and producing a temperature signal indicative of the torque converter temperature.

5. An electrohydraulic control device, as set forth in claim 4, including means for receiving the temperature signal and selecting the original impeller clutch pressure curve in response to the temperature signal being greater than a predetermined value.

6. An electrohydraulic control device, as set forth in claim 5, including a set of brakes and a hydraulic valve for producing fluid flow to the brake set to controllably engage and disengage the brake set.

7. An electrohydraulic control device, as set forth in claim 6, including means for adjusting the impeller clutch pressure proportional to the impeller clutch pedal position in response to the pedal being depressed from a first position to a second position, and adjusting the brake pressure proportional to the impeller clutch pedal position in response to the pedal being depressed from a second position to a third position.

8. An electrohydraulic control device, as set forth in claim 7, wherein the memory means stores a brake pressure curve that is responsive to the impeller clutch pedal position, the control means selectively controlling the braking hydraulic valve to produce the desired brake pressure in response to the brake pressure curve.

9. A method for controlling the torque of a drive train of a machine including an engine, a torque converter, an impeller clutch connected between the engine and the torque converter, and an impeller clutch pedal comprising the steps of:

producing an impeller clutch pedal signal in response to the position of the impeller clutch pedal;

storing a plurality of desired rimpull settings each corresponding to a maximum allowable impeller clutch pressure;

selecting a desired rimpull setting and producing a desired rimpull signal; and receiving the desired rimpull and the impeller clutch pedal signals, and producing a desired impeller clutch pressure responsive to the impeller clutch pedal position up to the maximum allowable impeller clutch pressure defined by the desired rimpull setting.

10. A method, as set forth in claim 9, including the step of modifying the desired rimpull settings.

11. A method, as set forth in claim 10, including the steps of:

storing an impeller clutch pressure curve that is responsive to the impeller clutch pedal signal;

receiving the desired rimpull signal and reconfiguring the impeller clutch pressure curve; and receiving the impeller clutch pedal signal and producing the desired impeller clutch pressure defined by the impeller clutch pressure curve.

12. A method, as set forth in claim 11, including the steps of:

sensing the temperature of the torque converter and producing a temperature signal indicative of the torque converter temperature; and receiving the temperature signal and selecting the original impeller clutch pressure curve in response to the temperature signal being greater than a predetermined value.

13. A method, as set forth in claim 12, including step of adjusting the impeller clutch pressure proportionally to the impeller clutch pedal position in response to the pedal being depressed from a first position to a second position, and adjusting the brake pressure proportional to the impeller clutch pedal position in response to the pedal being depressed from a second position to a third position.

14. A method, as set forth in claim 13, including the steps of storing a brake pressure curve that is responsive to the impeller clutch pedal position and producing a desired brake pressure in response to the brake pressure curve.

* * * * *